US008154798B2

(12) United States Patent
Katsenelenson et al.

(10) Patent No.: US 8,154,798 B2
(45) Date of Patent: Apr. 10, 2012

(54) PROJECTION SCREEN FOR DISPLAYING TWO-DIMENSIONAL AND THREE-DIMENSIONAL MOTION PICTURES AND METHOD OF USE THEREOF

(75) Inventors: Leo Katsenelenson, Los Angeles, CA (US); Stanley Tafeng Kao, Torrance, CA (US); Philip Yi Zhi Chu, Monrovia, CA (US); Engin B. Arik, Thousand Oaks, CA (US); Edward M. Kaiser, Redondo Beach, CA (US); Thomas C Forrester, Brentwood, CA (US)

(73) Assignee: Luminit LLC, Torrance, CA (US)

( * ) Notice: Subject to any disclaimer, the term of this patent is extended or adjusted under 35 U.S.C. 154(b) by 0 days.

(21) Appl. No.: 12/958,159

(22) Filed: Dec. 1, 2010

(65) Prior Publication Data
US 2011/0157695 A1      Jun. 30, 2011

Related U.S. Application Data

(60) Provisional application No. 61/265,608, filed on Dec. 1, 2009.

(51) Int. Cl.
G03B 21/56 (2006.01)
G03B 21/60 (2006.01)
(52) U.S. Cl. ........................... 359/443; 359/449
(58) Field of Classification Search ............... 359/443, 359/461, 452
See application file for complete search history.

(56) References Cited

U.S. PATENT DOCUMENTS

| | | | |
|---|---|---|---|
| 3,676,592 A | 7/1972 | Foster | |
| 5,237,436 A | 8/1993 | Khan et al. | |
| 5,365,354 A | 11/1994 | Jannson et al. | |
| 6,110,401 A | 8/2000 | Lee et al. | |
| 6,158,245 A | 12/2000 | Savant | |
| 6,829,086 B1 | 12/2004 | Gibilini | |
| 2002/0048729 A1 | 4/2002 | Nishikawa et al. | |
| 2007/0195406 A1 | 8/2007 | Wood | |
| 2007/0228927 A1 | 10/2007 | Kindler et al. | |
| 2009/0190210 A1 | 7/2009 | Coleman et al. | |

OTHER PUBLICATIONS

PCT Search Report No. PCT/US2010/058610.
LORS Reflection Screens, Lights on Reflection Screen, Price List Effective Date May 1, 1998, Physical Optics Corporation (1998).
Optical Solutions for OEM Applications (High transmission, Angular control, Homogenizer, High Resolution Screens, Physical Optics Corporation. 11 pages. (2001).
Light Shaping Diffusers, Diffuser Data Sheet, Physical Optics Corporation, 2 pages. (1996).
Holographic Diffuser Makes Light Work of Screen Tests, using photonics, Photonics Spectra, Laurin Publishing Co. Inc. (Aug. 1996).
SID '5 review; 1 page. (1995).

*Primary Examiner* — Christopher Mahoney
(74) *Attorney, Agent, or Firm* — Husch Blackwell LLP

(57) ABSTRACT

The present disclosure reveals a reflective, front-projection screen designed to faithfully and accurately display the images from state-of-the-art (SOTA) and next-generation 2D and 3D motion-picture projectors, such as those found in large-capacity public movie theaters, home theaters, offices, and for use with portable projection systems for consumer and commercial applications. In particular it discloses cinema-size light shaping 3D projection screens with front-surface microstructures and horizontal viewing angles in the range of 90 to 120 degrees.

17 Claims, 13 Drawing Sheets

PROJECTION SCREEN FOR DISPLAYING TWO-DIMENSIONAL AND THREE-DIMENSIONAL MOTION PICTURES AND METHOD OF USE THEREOF

CROSS-REFERENCE TO RELATED APPLICATION

This application claims the benefit of the filing date of U.S. Provisional Application Ser. No. 61/265,608 filed Dec. 1, 2009 and entitled "Projection Screen for Displaying Two-Dimensional and Three-Dimensional Motion Pictures and Method of Use Thereof".

BACKGROUND OF THE INVENTION

The present disclosure relates to the field of optics. More specifically, the present disclosure concerns front-projection cinema screens.

Movie theater industry guidelines dictate that when a movie is being projected the assembled screen seams should be invisible to the naked eye from a viewing distance of 1 to 1.5 times the screen's height (referred to as the "invisibility" requirement). In order to meet the "invisibility" requirement, the seam gap at each splice can be as large as from about 50 microns to about 70 microns in order for the seam to be unnoticeable by the moviegoer when a movie is playing, affording an undistracted content delivery and viewing experience.

In the fabrication of large-format reflective front-projection cinema screens for motion-picture applications, minimizing or eliminating variations inherent in the final manufactured screen material is a challenging process—the optical integrity of the screen is important as well as the absence of visible non-uniformities. Also, owing to the screen's weight, the seams in a screen should be able to withstand a constant stretching load in order to meet the minimum industry standards for front-projection cinema screens.

Currently produced commercial theater-sized (10'×20', 20'×40' and 40'×85' (IMAX) are common sizes) large-format front-projection cinema screens are made utilizing common seaming techniques such as ultrasonic welding, thermal welding or lamination to a back supporting material. Such backing aids are undesirable because they introduce weight and make the matching of acoustic perforations difficult.

Projection screens can be hung vertically to present a viewing surface to an audience in stadium seating. While a worker of ordinary skill in the art may vary the following directions in accordance with his needs, the exemplary embodiment describes structures and processes directed to a vertically hung dimensionally stable viewing surface. For commercial use in theatres, the vertically hung viewing surface described can remain flat without curling, buckling, or wrinkling under the influence of constant vertical and horizontal tensile loads of 4 to 6 pounds per inch over its useful (10+ year) lifetime. In particular, preserving structural integrity in these large formats, one aspect of the present invention, can minimize distortions to the motion picture image that would otherwise occur at the seams of the splices between viewing screen segments.

BRIEF SUMMARY OF THE INVENTION

The present disclosure reveals a reflective, front-projection screen designed to faithfully and accurately display the images from state-of-the-art (SOTA) and next-generation (NG) 2D and 3D motion-picture projectors, such as those found in large-capacity public movie theaters, home theaters, offices, and for use with portable projection systems for consumer and commercial applications. In particular it discloses cinema-size optical polarization preserving Light Shaping 3D projection screens with front-surface microstructures and horizontal viewing angles in the range of 80 to 130 degrees.

The front-projection screen of the present disclosure comprises several subsystems, taken together—either exclusively, or non-exclusively—in various combinations. These subsystems are: the seamless mastering and tooling used for creation of an "original" of the optical microstructures; providing a substrate with front-projection screen optical microstructures; the embossing process used to mass-produce the optical microstructures; the metallizing process applied to the mass-produced optical microstructures to enhance reflectivity and preserve the polarization of projected light; the hard-coating process that protects against the wear-and-tear caused by environmental conditions such as oxidation and handling damage, such as cleaning; and the "screen-making" processes necessary for final assembly of the final product: seaming, perforating, framing, and packaging suitable for deployment of the cinema screen in a large movie theatre (or other relevant venue) without inflicting damage to the front-projection screen or otherwise impairing its optical, mechanical, or acoustic performance.

CONCISE DESCRIPTION OF THE DRAWINGS

DETAILED DESCRIPTION OF THE INVENTION

Figure 1:
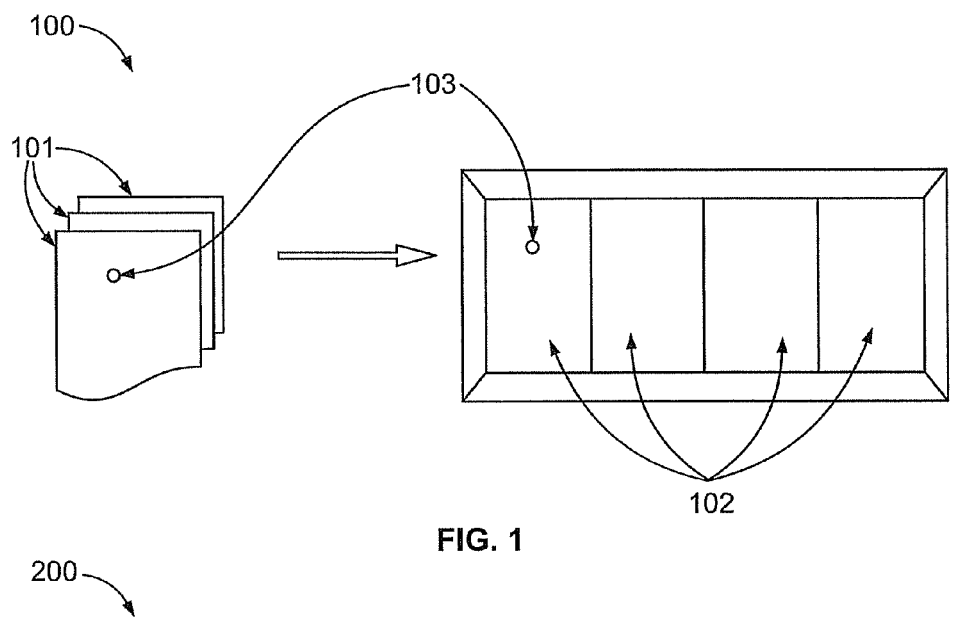
FIG. 1 is a graphic showing the projection screen of the subject invention.

Although the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be further understood that the title of this section of the specification, namely, "Detailed Description of the Invention" relates to a rule of the United States Patent and Trademark Office, and is not intended to, does not imply, nor should be inferred to limit the subject matter disclosed herein or the scope of the invention.

The disclosed embodiments are for exemplification and a person of ordinary skill in the art will understand that the proposed front-projection system disclosed can be modified and added to for various applications. Accordingly, it will be understood that the scope of the invention is not to be limited to these embodiments.

Fabricating the present invention to meet the demands of the motion-picture industry is promoted by the application of several multi-disciplinary manufacturing processes and techniques. The present disclosure covers processes and techniques that have been specifically developed or adapted to make the disclosed front-projection screen, which in the movie industry is often called a movie screen or cinema screen. For this disclosure, the axis of a vertically hung screen that is along the line of the pull of gravity and in the plane of the projection screen is the Y-axis, the axis that is generally perpendicular to the pull of gravity and in the plane of the screen is the X-axis, and the axis that is perpendicular to the plane of the screen and the pull of gravity is the Z-axis. Also, for relative positioning, the terms front, back, top and bottom are from the perspective of a viewer of the reflective screen.

Referring to FIG. 1 a preferred embodiment of the projection screen 100 of the present invention comprises a set of optical screen material sheets 101, which are coated with a continuous array of optical microstructures 103. Seamed sheets 102 together form a continuous front-projection cinema (movie) projection screen. The exemplary screen of the present disclosure can be used for both 2D and 3D projections meeting the high standards of the film industry. Smaller-format home theater and office projection 2D/3D screens can be manufactured using several different fabrication techniques from those described for the movie theatre projection screen.

Figure 2:
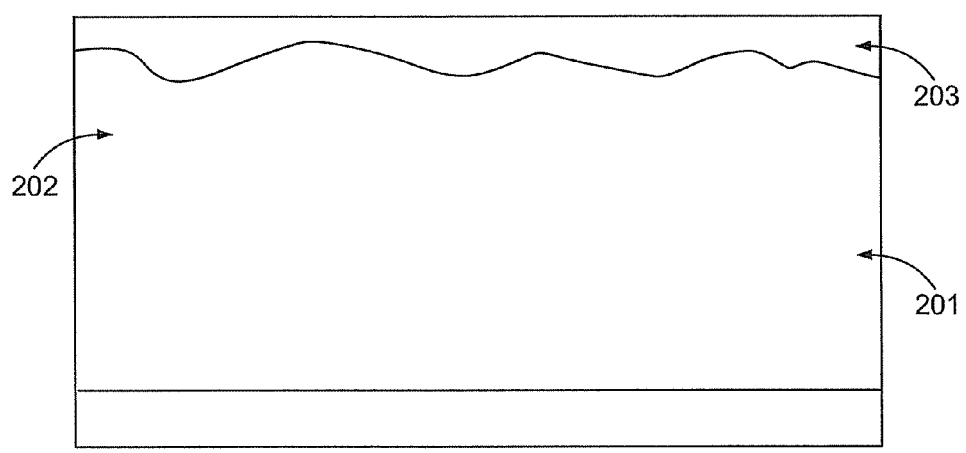
FIG. 2 is a cross-section of a portion of FIG. 1.

An example of a cross-section of location 103 is shown in FIG. 2, photomicrograph 200. The photomicrograph 200 is oriented so that the Z-axis is pointed upward, and the X- and Y-axes are going in-and-out of the surface of the image or side-to-side. The photomicrograph shows a transparent polymer film substrate 201 with a layer of epoxy resin 202 on the projecting surface shown to the audience. Individual microstructures 203 are formed in the epoxy. Prior to metallization, the microstructures 203 in FIG. 2 diffuse light from the front of the screen to the back of the screen at an angle of 14° (angle measured in transmission mode in full-width at half-maximum (FWHM)) before front surface metallization, which converts the optical microstructures from transmissive to reflective, an operable microstructure for the present invention. The present disclosure is not limited to diffusion angles of 14°, and can also be in the range of 8° to 22° FWHM, preferably in the range of 12° to 17°. The optical microstructures 203 reflect the light emitted by a movie projector or similar instrument in a specific viewing zone to a viewer. In the exemplary structure of photomicrograph 200. The epoxy resin 202 ends in an interface region 205. The interface region 205 has a bi-layer 207 that are too thin to resolve in the photomicrograph. The first layer in contact with the bulk of the microstructure 203 comprises a very thin (from about 700 to about 1200 Angstroms) reflective layer, conformably coated to the epoxy layer. This layer may comprise aluminum, silver, or a silver/gold alloy. The first layer of the bi-layer comprises almost all of the visible wavy line of the interface region 205. The second layer is a conformably coated very thin layer of protective material (sometimes known as a hard-coat), in order to protect the reflective optical microstructures from damage. It can have different thicknesses depending on whether only protection is desired, or whether tuning of the viewing angle is desired. Thicknesses of one or more protective layers can vary from 25 to 250 angstroms. In FIG. 2, this hard coat may comprise $SiO_2$, $SiO_x$, $TiO_2$, or TiN. Region 208 is aluminum that has been added to the structure to render it amenable to photomicrograph study.

Figure 3:
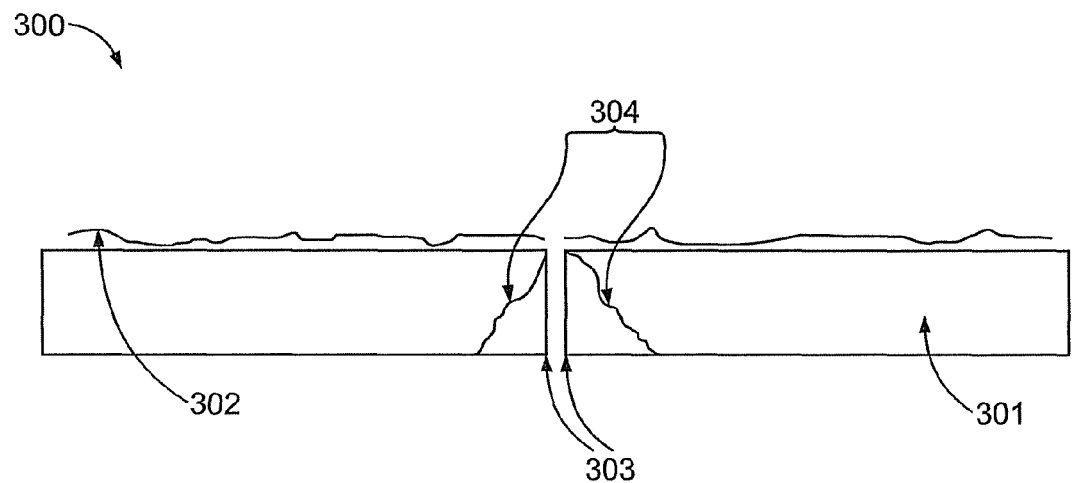
FIG. 3 is a plan view of a continuous roll with a top layer of the optical microstructures.
Figure 4:
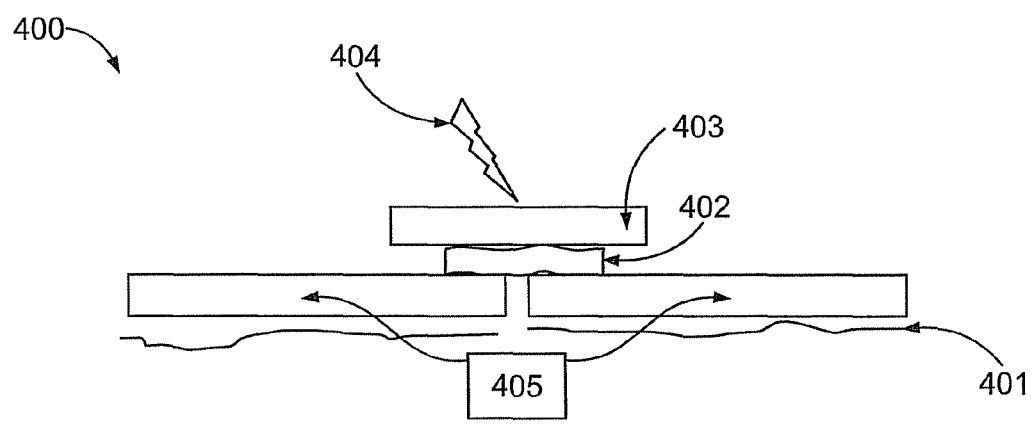
FIG. 4 shows two strips about to be seamed together with resin.
Figure 5:
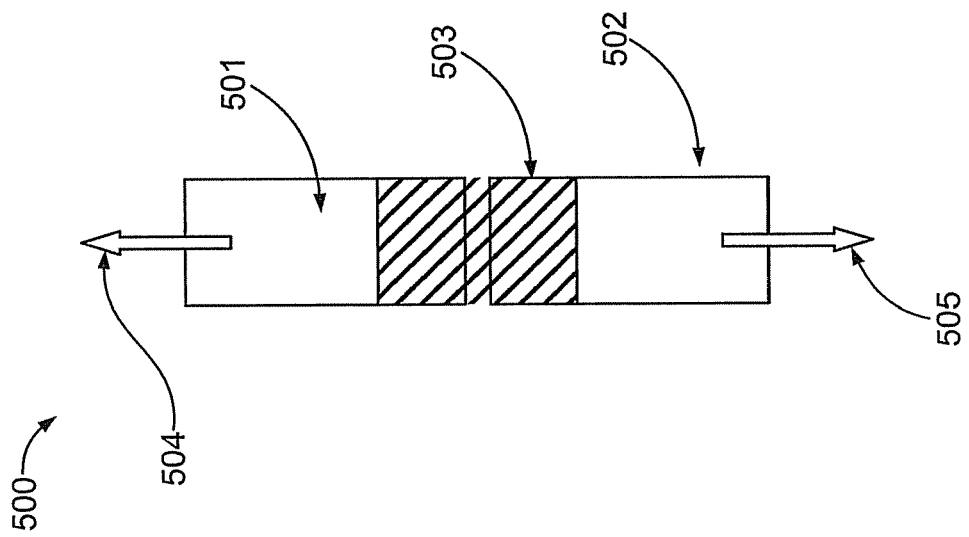
FIG. 5 shows the two striped seamed and subject to tension.

Referring to FIG. 3, once the continuous roll(s) are fabricated, their edges are cut at right angles 303 (a typical, undesirable bevel cut 304 is shown for comparison) so as to provide the maximum support for, and minimal damage to the optical microstructures 302. Referring to FIG. 4, once aligned 400, the two strips 405 are seamed (spliced) together on the side opposite the optical microstructures 401 by applying the same epoxy resin 402 that was used to form the optical microstructures 401. Chemical welding processes can also be used. A strip of bare polymer film substrate 403 is then applied to the epoxy resin with pressure, heat, and UV radiation 404 to splice the two strips 405 together.

Once spliced (seamed) together, the subassembly 500 is subjected to tension at points 504 and 505, with the objective being to test whether the gap between sheets 501 and 502 elongates due to deformation (stretching) of the spliced (i.e., taped) area 503. Ideally, this gap should not increase from its original (about 50 to about 70 micron, with 60 microns being preferred).

The term "seamless" in the context of this disclosure refers to the absence of a short horizontal "repeat seam" formed during traditional roll-to-roll fabrication processes, and which might impinge the rolls of material from which the screen is made —and not the long vertical "seam" found between individually-spliced sections of screen material.

The feature sizes of the microstructures in the plane of the reflective screen can be about 1 to about 30 micrometers, and a modulation of less than about 5 micrometers normal to the screen. The features can have an average feature pitch of 20 to 60 microns, feature height of from 10 to 15 microns, and average feature length and width of 20 to 30 microns.

The surface of the micro-replicated and metallized polymer substrate film for the cinema screen benefits from precise replication in providing a good viewing experience. The creation of the seamless master drum upon which the laser-speckle generated optical microstructures are initially formed is accomplished with apparatus and methods disclosed in U.S. patent application Ser. No. 11/879,327, which is incorporated by reference in its entirety as if set forth fully in this disclosure.

The optical microstructures 203 as shown in the photomicrograph are smoothly varying in shape and of irregular size and placement. The imaged microstructures' 203 shape, size and placement can be random in the same way as controlled laser speckle. U.S. Pat. No. 5,365,354 discusses shape size and placement, and methods for controlling the properties of such speckle and is incorporated by reference as if set forth fully here. The optical microstructures can be of many types the detailed example of this disclosure uses a light shaping diffuser structure. While the detailed exemplary embodiment that follows is based on a particular light shaping diffuser microstructure, a particular light shaping diffuser microstructure (average feature pitch of 40 to 60 microns, feature height of 10 to 15 microns, and average feature length/width of 20 to 30 microns), there are other microstructures that be used that will have different advantages to those of the microstructure in this disclosure.

In this disclosure the substrate will originate as a continuous roll of material. Nevertheless, the substrate can be provided in a number of forms, including additionally, but not limited to flat sheets.

An optical screen material sheet can comprise a substrate of from about 10 mil to about 20 mil polycarbonate (PC) film. 15 mil film is used in the exemplary specific embodiments result in screens that can be prohibitively heavy. Alternate substrate materials are transparent or non-transparent PET, PETG, PVC, PVDF, and Polyimide such as Dupont's Kapton® brand polyimide film.

Roll-to-roll replication of the microstructures on the seamless master drum onto continuous film substrate is accomplished with apparatus and methods disclosed in U.S. patent application Ser. No. 11/649,428 which is incorporated by reference in its entirety to this disclosure.

As an alternative to the hot embossing method, a layer of epoxy may be laid over the substrate for the optical material sheet and shaped into the microstructures 203 shown in FIG. 2. In U.S. Pat. No. 5,365,354 a master pattern can be made by providing a recording medium such as dichromated gelatin (DCG) or another volume recording material on a stable substrate such as glass. A mask diffuser aperture can then be placed between the recording medium and a source of coherent light. Then random, disordered, and non-planar speckles are non-holographically recorded on the recording medium on said recording medium by shining the coherent light that is scattered by the mask diffuser, on the surface of the recording medium in a way that the recording medium does not retain phase information. The field of random, disordered and non-planar speckles constitutes a pattern of the type shown in FIG. 2 recorded in the recording medium. The recording medium is then processed according to the procedures attendant to such recording medium. During the recording the light is controlled so that the speckles define non-discontinuous and smoothly varying changes in the recording medium so as to provide scatter, with non-discontinuous reflection, of light traveling from the first surface to the second surface. The statistical average size of the recorded speckles is inversely proportional to the angular size of the aperture viewed from the center of the diffuser.

As in U.S. Pat. No. 6,158,245, submasters can be made from a master. A frame is fastened to the edges of the master. The master should have edges rising slightly above the top surface of the master. Silicone rubber can then poured into the frame over the photoresist layer and allowed to cure. The silicone rubber constitutes an inverse submaster that is then separated from the photoresist/glass master. Use of silicone rubber permits separation of the submaster without damaging the master. Subsequent films matching the master may then be made from the inverse submaster by using epoxy supported by the polypropylene sheet or other desirable film medium.

The structure of FIG. 2 shows an epoxy layer over polycarbonate. U.S. Pat. No. 6,110,401 discloses a simple, fast, and reliable method and apparatus for replicating a light shaping surface structure on a laminated surface of a relatively rigid substrate. After the substrate is mounted on a table and a layer of epoxy is deposited between the substrate and an inverse submaster to produce a layered structure, the layered structure is automatically compressed in a nip formed between the table and an outer surface of a rotating impression roller, thereby replicating the surface structure in the epoxy layer. The submaster can be a polycarbonate sheet or other material with the inverse of the patterned surface incorporated in it. The epoxy is then cured, and the submaster is separated from the substrate to leave a laminated structure having the microlens array structure at its surface. Operably, the submaster can be wrapped around the impression roller, and the impression roller is rotated while the table is reciprocated linearly to compress the layered structure in the nip. In order to prevent slippage between the submaster and the substrate, the rotational speed of the impression roller is matched to the translational speed of the table during the compressing operation—preferably by using the submaster as a drive belt to drive the roller to rotate upon table movement. The replicator preferably also automatically cures the epoxy after the compressing operation and then automatically separates the submaster from the substrate.

One method of rendering a substrate into a suitable optical material sheet uses direct thermal replication also referred to as hot embossing. The hot embossing of polymer is introduced to improve product quality and simplify the layered structure of the screen by removing the need to add a resin-based coating to the substrate in order to form the LSD microstructures. During the hot embossing process the polymer undergoes plastic deformation. Understanding the flow behavior in this region can promote a successful manufacturing process with consideration of the solid/liquid-like flow behavior of these polymers slightly above the glass transition temperature, $T_g$.

To understand the dynamics of the formation of the microstructure, a finite element method (FEM) can be used to analyze the embossing step, the cooling step and the demolding step of existing hot-embossing techniques with respect to product quality. Those of ordinary skill in the art can conduct finite element analyses of polymer flow by a variety of methods such as mold flow analysis. Profile precision is largely influenced by the topological structure of the mold during the embossing step. Inadequate holding time will result in low pattern fidelity. Inappropriate demolding temperature could induce a large thermal stress at the bottom of the micro pattern, while keeping imprint pressure during the cooling step will aggravate this phenomenon. Fracture, necking and pattern distortion can easily be induced by adhesion between the polymer and the mold when high aspect ratio patterns are remolded. The results of the finite element analysis will vary by the product at issue and the operating parameters of the equipment selected by the skilled worker.

In the hot embossing method, which is well known to those of ordinary skill in the art, a nickel shim with a patterned surface can be used as a mold or tool. During thermal replication, under elevated temperatures (greater than the glass transition temperature of the release film) and uniform pressure, the pattern on the nickel surface can be transferred to the surface of a film of appropriate material.

Successful fabrication of fine patterns with a high aspect ratio (e.g., 2:1) has been validated by the use of finite element analysis modeling. Hot embossing is an effective method for mass-production of LSD microstructures formed by imprint lithography and photo-resist reflow at room temperature. Electroforming is then applied to fabricate the Ni mold insert for the master, followed by gas-assisted hot embossing to replicate the microlens arrays. The isotropic gas pressure on the plastic film against the Ni mold produces plastic microlens arrays of high quality and uniformity. The effects of processing parameters including the processing temperature, pressure, and time on the replication quality of microlens arrays were investigated. Experimental results show that the filling of molded diffuser significantly increases as the processing temperature and pressure increase. The deviation of the topology of the replicated microlens from that of the mold is less than 0.25%. Compared with the conventional hot embossing processes, this new replication method offers more uniform embossing pressure distribution. Hot embossing has great potential for replicating LSD arrays on large plastic films with high productivity and low cost.

Figure 20:
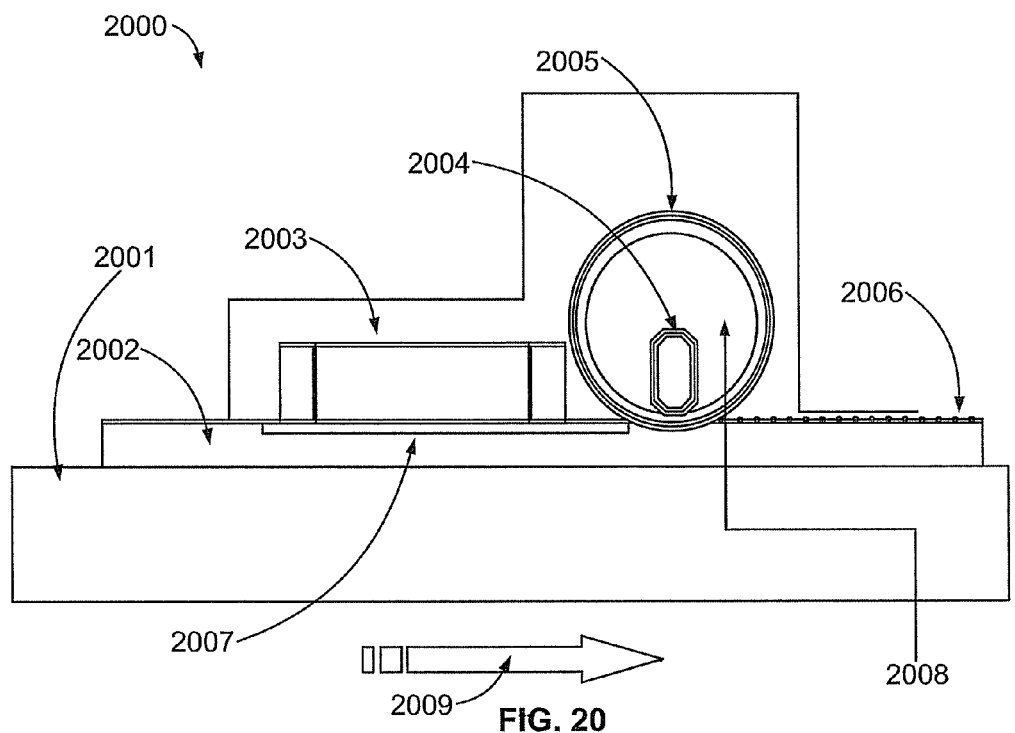
FIG. 20 is a schematic of a hot embossing machine for use in placing a microstructure on the polymer substrate in the manufacture of the screen of the present invention.

Referring to FIG. 20, one aspect of the current invention is an improved hot embossing machine 2000 comprising a processing table 2001 which supports a roll-to-roll mounted polymer substrate such that it may pass underneath (in the direction indicated by arrow 2009) an embossing drum with a diamond like carbon (DLC) coating 2005, the surface morphology of which comprises a negative copy of a light shaping diffuser (LSD) or other microstructure array. As the moving polymer substrate approaches the embossing drum, which is heated by thermal element(s) 2008, its top surface is pre-heated by a microwave energy heating element 2003 in a region of controlled depth 2007 slightly above the polymer substrate's glass transition temperature, $T_g$. This preheating helps to control the precise temperature of the region which is heated only slightly above $T_g$, facilitating the embossing of a virtually distortion-free microstructure 2006 into said preheated region only, leaving the regions not preheated undisturbed. Mold release is enhanced by mechanical shock delivered via a piezoelectric transducer element 2004 vibrating as needed in the region of 20 Hz to 200 kHz.

The substrate that has been embossed with microstructure can then have a reflective layer applied. A controlled deposition rate of the thin (around 700-1200 nm; OD of 2, minimum) metallic reflective coating promotes maintaining the fidelity of the microstructures after coating.

Layer thickness adjustments can be made globally to all strips comprising a screen or differently to individual strips creating a custom position-specific pattern from N to S and W to E directions to create a "virtually curved" screen. This is accomplished by varying the deposition rate of the top transparent (clear) coating while an individual strip is travelling through the coating machine for N/S (i.e., top to bottom (vertical)) customization or by varying the coating deposition speed from strip-to-strip for E/W (i.e., left to right (horizontal)) customization. Flexibility and high accuracy of control over the deposition process enables fabrication of large articles (e.g., segments of movie screens) with quasi-continuously variable reflection properties in horizontal & vertical directions.

Currently, two techniques are utilized to apply protective coating to the polarization-preserving front-metalized layer of the LSD-bearing films of the present invention—physical vapor deposition (PVD) and low volatile organic conformal coating (LVOC). Also, producing a final, usable screen can benefit from a hard protective coating (e.g., silicon dioxide) with a pre-determined (preferably well-controlled) deposition rate in order to preserve the microstructures and enhance the gain of the image through stronger reflection. Ability to control reflection angle without changing the master diffuser angle will help to avoid the necessity for curved screen construction in the future (building curved screen frames is often difficult and/or expensive) by providing curved-screen performance with a planar geometry.

In the case of physical vapor deposition (PVD), the thickness of $SiO_2$ or other clear protective coatings can be controlled by the deposition rate. By increasing or decreasing the thickness of the clear protective coating, the angle of the reflected light originating from the theater's movie projector can be adjusted, tuned, and optimized in order to maximize photon conservation depending on the end-user's specific requirements for brightness, viewing angle, and, specific wavelength or designs of the projection system. The light shaping screen of the present disclosure, in addition to its ability control viewing angle by virtue of its microstructure design(s), can have additional control over the viewing angle by altering the thickness of clear coating on top of the metallized, such as with aluminum, layer. Only a very thin metal layer (about 25 Angstroms) is necessary for "hard coat" scratch and wear protection. Adding additional thickness provides the ability to fine-tune the viewing angle after the base angle has been set by the underlying reflective LSD microstructure.

Following is supporting experimental data documenting the change in viewing angle that is proportional to top-coating thickness. As one can see in the third row of the table, by adding 50 Å (angstroms) of silicon dioxide, the angle increased by ~16%. At the same time, gain and contrast are still surprisingly above minimum industry specifications (i.e., a gain of 1.5 and a contrast ratio of 200:1) for such screens.

TABLE 1

Effect of Protective Coating Thickness on Viewing Parameters

| Sample | Gain | Contrast | Angle (in Degrees) |
|---|---|---|---|
| Sample C (control, no $SiO_2$) | 1.74 | 610 | 82 |
| Sample A (50 Angstroms $SiO_2$) | 1.68 (−3.2%) | 546 (−10.6%) | 96 (+16.0%) |
| Sample B (100 Angstroms $SiO_2$) | 1.66 (−4.6%) | 479 (−21.6%) | 98 (+19.5%) |

As stated movie screens for theatres are large, usually 10'×20', 20'×40' or 40'×85'. Rather than being made from one very large piece of material, it can be practical to manufacture or obtain screen segments that are smaller in size and assemble them as discussed in relation to FIG. 1. After the continuous roll(s) of screen material are fabricated, they can be cut into individual strips and aligned to provide the maximum support for, and minimal damage to the optical microstructures on the screen material. Once aligned, pairs of strips can be seamed (spliced) together from the side opposite the optical microstructures by applying the same or similar epoxy resin that was used to form the optical microstructures to the regions adjacent to the abutted edges. A strip of polymer film substrate can then be applied to the epoxy resin with one or more of pressure, heat, and UV radiation by a seaming device, in order to splice adjoining strips together.

An overview of the process is described earlier in conjunction with FIG. 4. Two strips of optical screen material are placed in spaced relationship to each other. Each piece of optical screen material has a first face having optical microstructures, a second face, and a splice end. While 60 mil seams are discussed in relation to screens for deployment in typical movie theatres, those of ordinary skill in the art can calculate the size of seam that will suit the viewing quality requirements of a particular application. The scope of enablement of the present disclosure is not limited to a particular size of seam.

The Z-axis step differential of the seamed joint can be less than or equal to 5 microns due to the fact that the seam will become visible to the moviegoer if the z step is larger. Such a discontinuity will be detected by the human eye because it either causes a shadow to be cast by the surface that is more than 5 microns closer to the moviegoer (causing a dark line to appear) or noticeable specular reflection will occur off of the laser-trimmed edge of the surface that protrudes more than 5 microns towards the moviegoer (causing a bright line to appear). A substrate of 15 mil polycarbonate (PC) film for theater (cinema) size screens has been found, experimentally, to be suitable for projection screens for movie theatres. Thicker flexible substrates (20 to 30 mils) result in screens that may be prohibitively heavy. Alternate substrate materials are transparent or non-transparent PET, PETG, PVC, PVDF, and Polyimide such as Dupont's Kapton® brand polyimide film. Two prime cinema screen sizes 20'×40' & 40'×80' made of polycarbonate strips of film experience structural loads from handling and deployment and stretching on their mounting frames. On average, the screens will be subjected to 5 lbs/in continuous static loads in order to maintain the necessary tension.

Seaming of 15 mil thick polycarbonate strips 40 feet long benefits from adequate tooling. Using welding, such as is done for standard movie screens, for seam fabrication of sheeting having microstructure introduces two problems: damage to the micro structure and wide (>200 micron) seams.

A somewhat more detailed disclosure of the handling involved in the making the exemplary embodiment of the present disclosure follows. One part of the process can be achieved through vacuum table and laser cutting. The use of a vacuum table with a gantry-mounted laser cutting head for the handling and processing of a plurality of sheets of screen material is described below.

The vacuum table should be large enough for the entire screen to lay flat on the table with appropriate margin for the handling of material 1.5 times the width of one strip. Vacuum tables that use "Gerber" type of honeycomb panels as a top section are appropriate and can be ordered from Newport Corporation, having a global headquarters at 1791 Deere Avenue, Irvine, Calif., USA, among many other vendors worldwide. Support structure/foundation of the table made of standard structural extruded sections. The face/top of the table has aluminum anodized sheets having a pattern of micro-perforations. Vacuum is pulled through the micro-perforations by a vacuum pump attached to the vacuum channels. Vacuum channels attached to the back side of table. The table structure allows using a gantry system with an applicator head attached. The vacuum table also has the ability to provide outward flow of air from the face to float materials on a cushion of air so that they may be moved without touching the table face. The size of the table will depend on the size of the largest screen that is to be made on the table. For example, a 50'×80' table can be used for IMAX size screen fabrication. Precision laser cutting done by laser head with a laser guided translation stage in addition to the precision gantry guide rails for quality control purposes. CO2 lasers having a power from 2 KW to 20 KW can be used, depending on required speed and substrate thickness. Alpharex offers large precision cutting laser cutting heads that are gantry mounted through a number of distributors. Other companies also manufacture such systems. In general all materials need to be handled carefully in a clean environment to achieve high-quality results. Appropriate precautions are known to those of ordinary skill in the art.

The first step is to unroll a long (e.g., 20 to 40 foot) section of a microstructure-bearing optical material sheet with the microstructure facing down onto the large vacuum table in the laser-cutting section of said vacuum table. The second step is to immobilize the section's position upon the vacuum table with (partial) vacuum suction. The appropriate settings will vary with each vacuum table and each type and composition of microstructure. Where there is doubt as to settings, smaller samples of microstructure should be tested to assure that the microstructure will not be damaged when the handling of large pieces is done. The third step is to laser slit (i.e., laser cut) the right-hand edge of the first odd-numbered section by moving the activated laser cutting head in a straight (+/−5-10 microns) line down the length of the film strip. This prepares the right-hand edge for splicing with the first even-numbered film strip. Note that on the first and last strips one can cut one edge, not two. The edge that will form the exterior edge of the assembled screen need not be precision cut with a laser. All other strips should have two precision cuts. Once all of the cuts on a section are complete the section is referred to as a precision-cut section.

Figure 6:
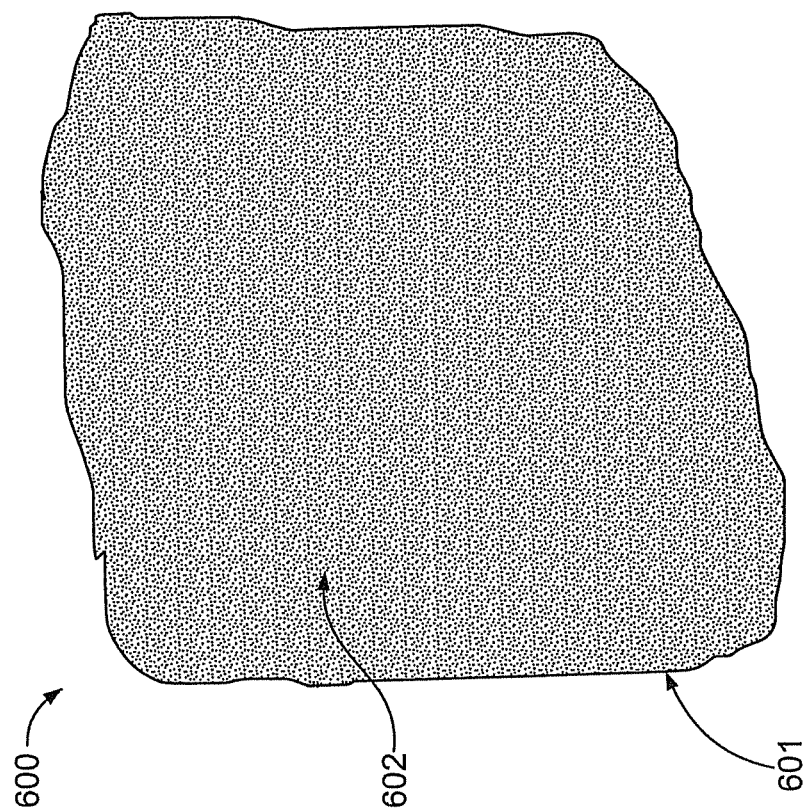
FIG. 6 shows perforated screen material.
Figure 7:
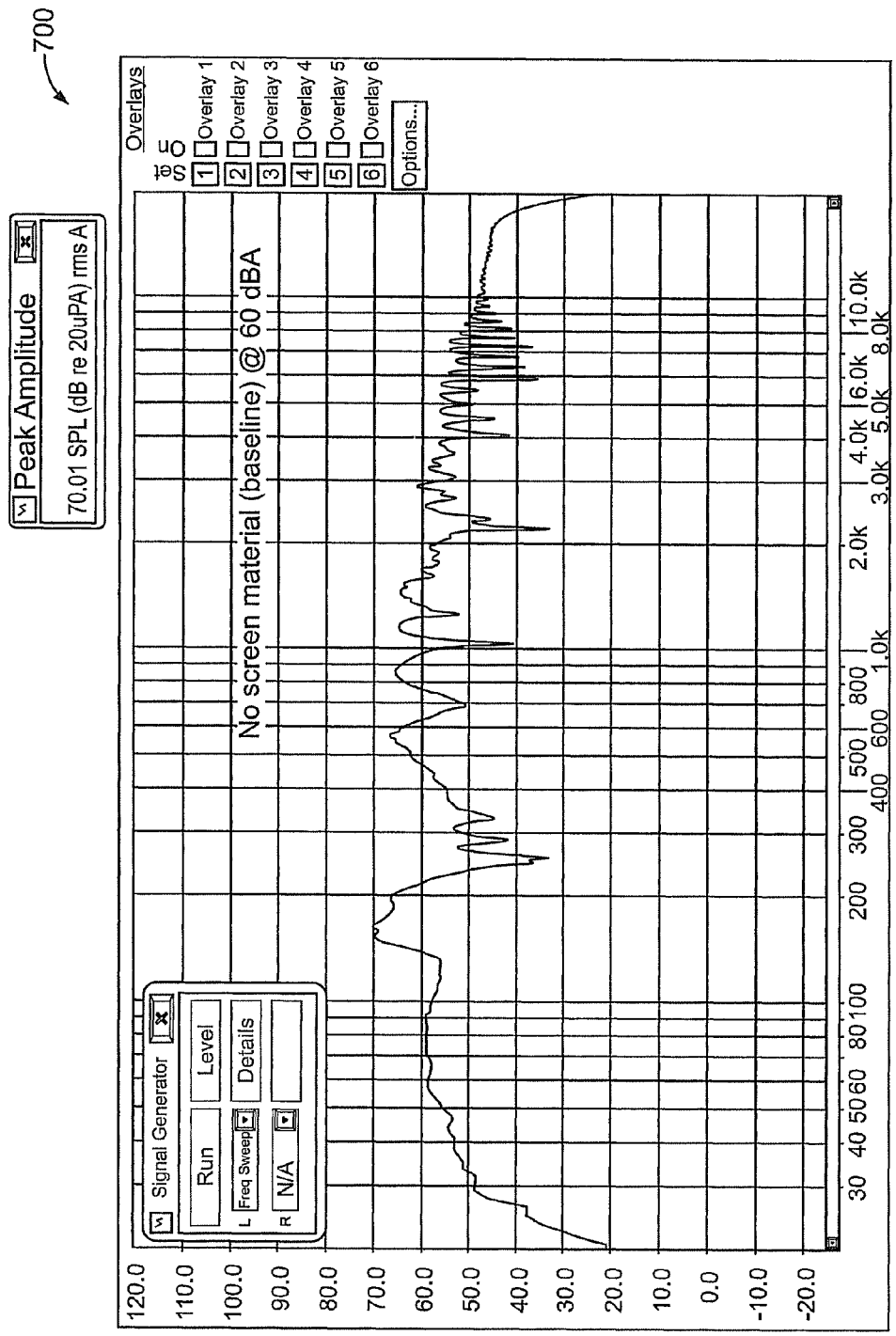
FIGS. 7, 8, 9 and 10 are graphs of acoustic transparency.
Figure 8:
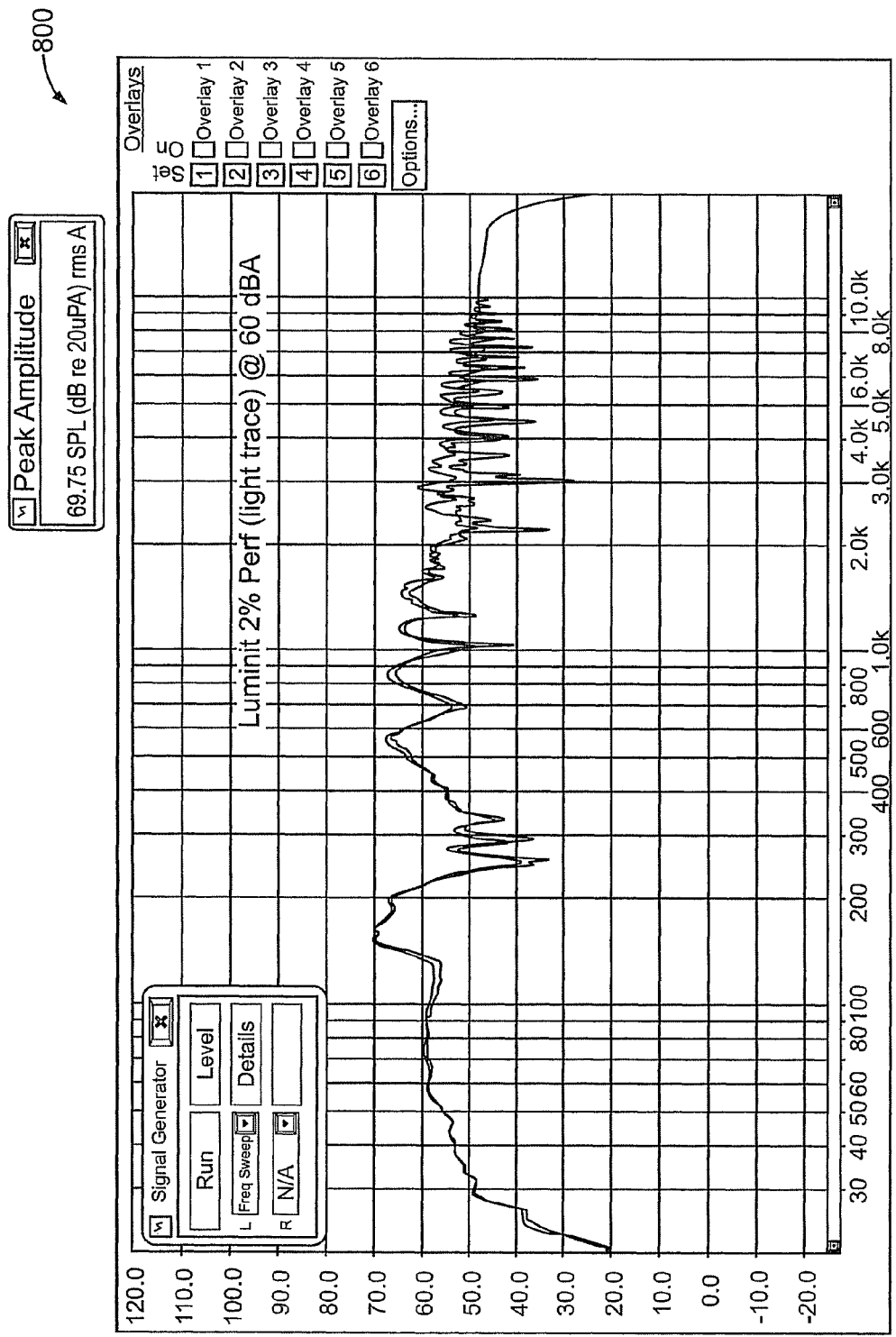
Figure 9:
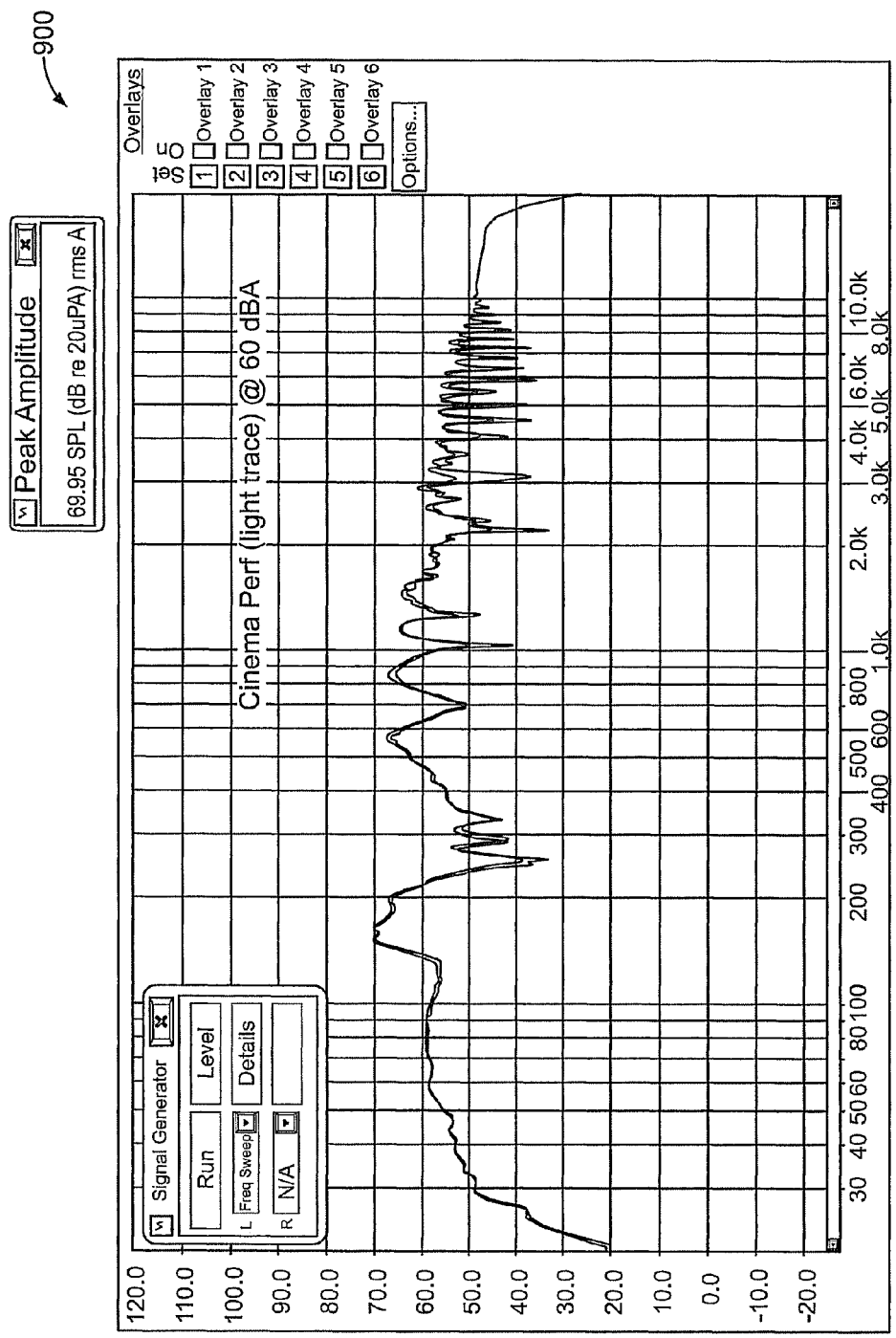
Figure 10:
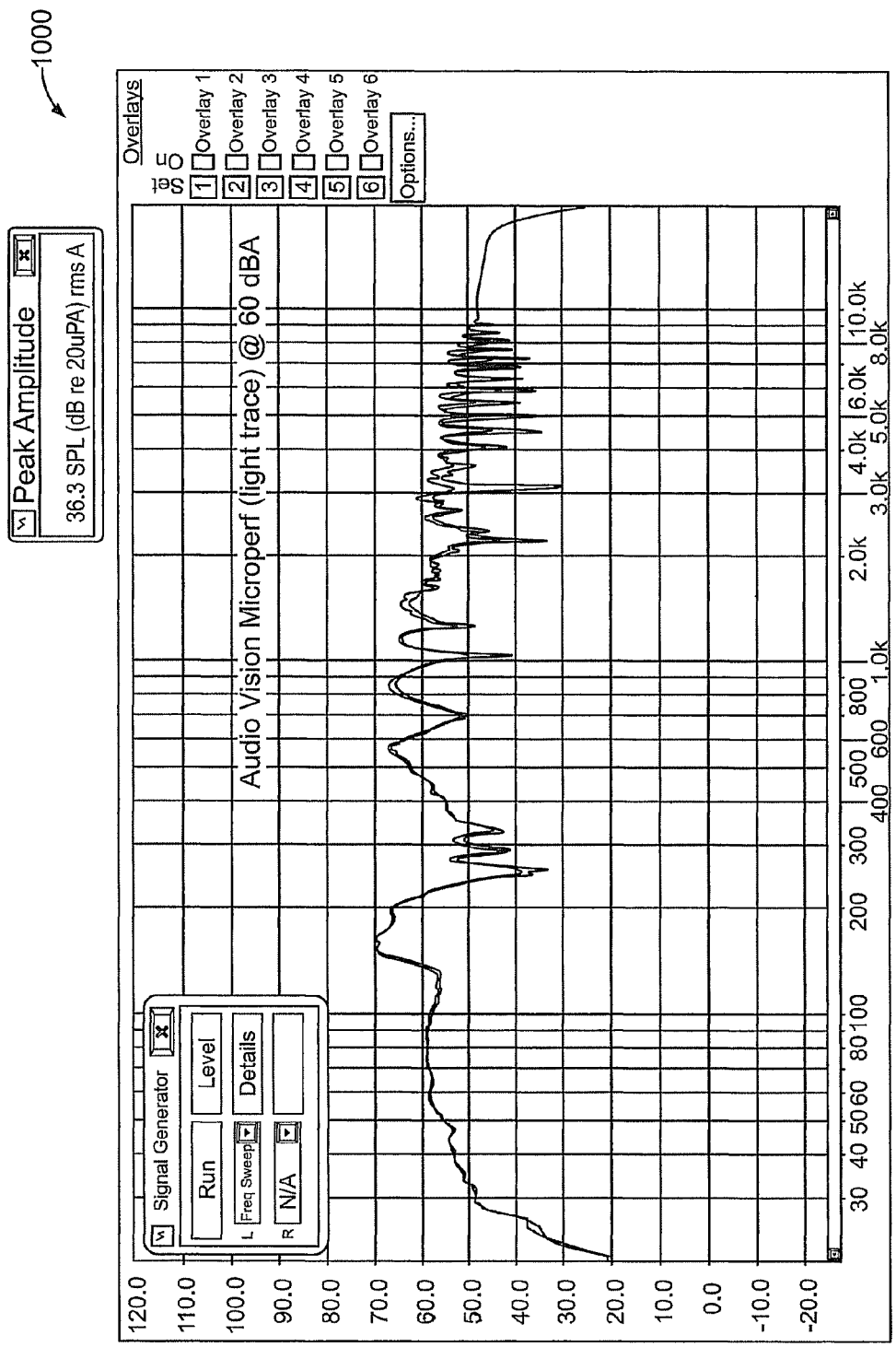

The fourth step is laser perforation of the first odd-numbered precision-cut section. The purpose of the laser perforation process is to allow air-propagated acoustic waves (sound) in the range of 20 Hz to 20 kHz emitted from speakers positioned behind the fully-installed screen to reach moviegoers with an acceptable level of attenuation and distortion. Referring to FIG. 6, after suitable rolls of 2D/3D front-projection screen material are fabricated, they are (optionally) perforated for acoustic transparency by precision-punching, via laser drilling, holes 602 in the screen material 601, removing from 2-7% of the screen material, which allows sound to pass relatively undisturbed through the completed screen. Also, high-speed laser perforating techniques can preserve the optical performance of the screen and provide for audio transparency of the screen while the material is on the vacuum table. The perforating of the screen can be accomplished by having the cutting laser vaporize holes into the strips as the strips are being cut. This can be done by making a long cut along the length of the continuous roll from the end of the roll toward the body of the roll for form a first long edge. Then, on the return, perforate the strip while rasterizing the laser, then on the second cut, establishing a second long edge and making an end cut to free the strip.

The screen, manufactured and perforated according to the present disclosure, has acoustic transparency on-par with that of existing 2D screens when subjected to sound pressures at an average of 60 dBA from 20 Hz to 20 kHz. The reflectance of the screen maintained reflectance advantages over standard cinema screen material.

TABLE 1

Reflectance Testing
Screen Testing

| 2D Stewart White Screen 8-bit gray via DDR | x | y | cd/m² |
|---|---|---|---|
| 0 (black) | 0.3412 | 0.3315 | 0.03072 |
| 255 (white) | 0.3136 | 0.3316 | 41.53 |
| 2D/3D Screen of This Disclosure | With Perforations | | |
| 8-bit gray via DDR | x | y | cd/m² |
| 0 (black) | 0.3377 | 0.3344 | 0.04429 |
| 255 (white) | 0.3166 | 0.3315 | 75.14 |
| | Without Perforations | | |
| 8-bit gray via DDR | x | y | cd/m² |
| 0 (black) | 0.3445 | 0.3366 | 0.05094 |
| 255 (white) | 0.3157 | 0.3315 | 78.40 |

Referring to FIGS. 7, 8, 9, and 10, one can see that the present invention's acoustic transparency 800 is on-par with that of existing 2D screens 900, 1000 when subjected to sound pressures 700 at an average of 60 dBA from 20 Hz to 20 kHz.

Figure 11:
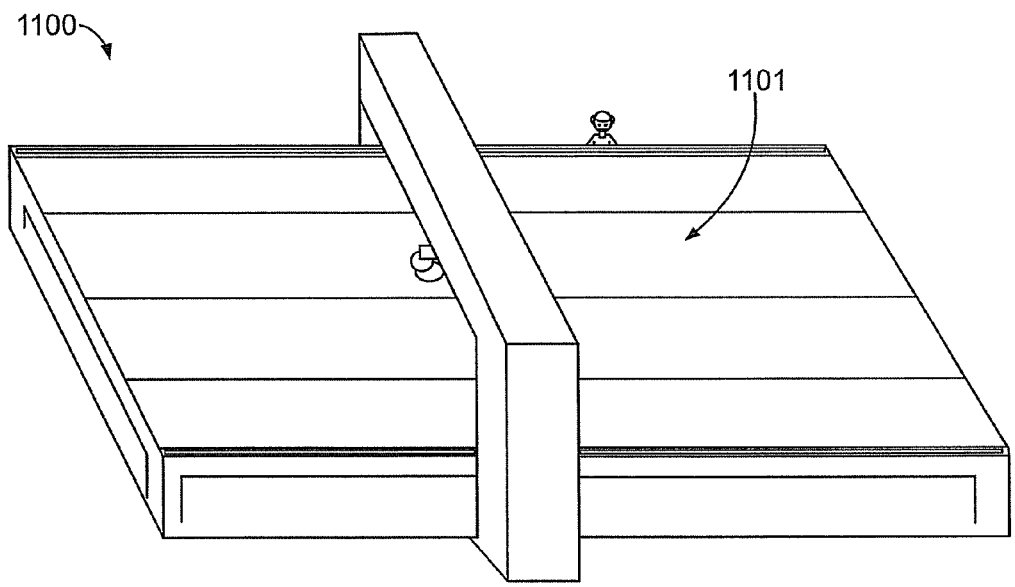
FIG. 11 shows screen material arranged on a vacuum table.
Figure 12:
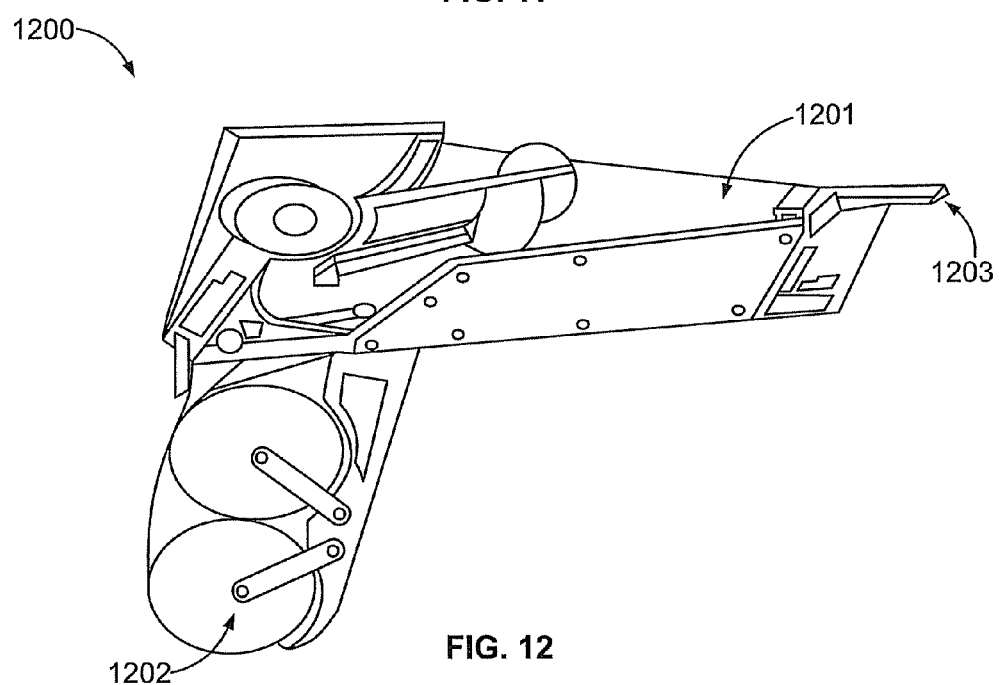
FIG. 12 is an electronic tape feeder.
Figure 13:
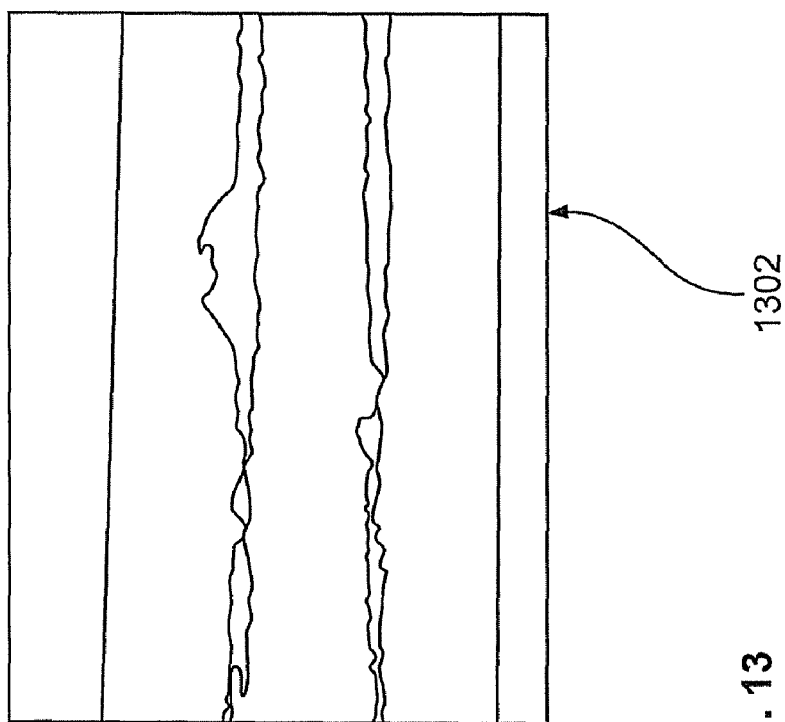
FIG. 13 is a comparison of the results of different seaming techniques.
Figure 13:
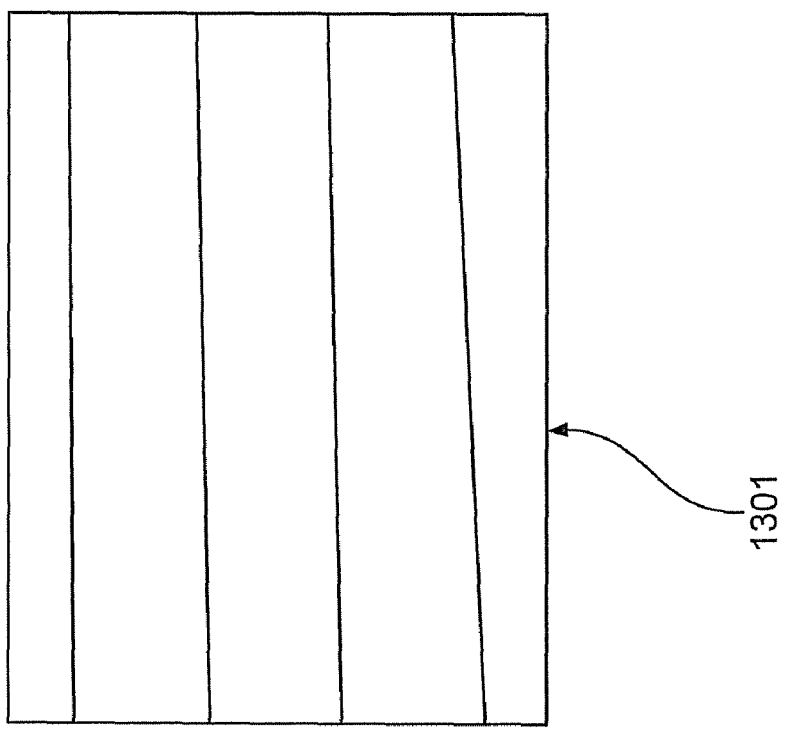

The sheets of screen material 1101 can be aligned on a large-format vacuum table 1100 as shown in FIG. 11. After precision alignment using laser-based optical alignment techniques, the sheets are all seamed/spliced together by an electronic tape feeder 1200 as shown in FIG. 12. The electronic tape feeder 1200 supplies the bare "tape" substrate seaming strip 1201 from reel 1202 and epoxy resin, such that the seam can be laid by application head 1203 at speeds of approximately 2 linear feet per minute. Referring to FIG. 13, a comparison of seaming techniques 1300 clearly shows that the precision application of epoxy (adhesive), pressure, and radiation by the present invention's "all-in-one" seaming device promotes a uniform, image-preserving seam 1301.

The fifth step involves relocating the first odd-numbered precision-cut section to a seaming/splicing process section of the vacuum table area with the film under positive pressure. Positive airflow releases to vacuum hold quickly and allows the film to "float" (in much the same manner as the puck floats on an air-hockey table) about the vacuum table which helps protect the front of the film with the Light Shaping Diffuser structure from damage by handling that might occur if the film had to be peeled and slid or otherwise physically handled in order to move the film strips about the vacuum table under ambient atmospheric pressure. Friction between moving strips and surface of the table can damage the optical/coated surface of the optical sheet material or section.

The sixth step involves slitting the first even-numbered film strip as in Step 3, above, except that both the left and right hand edges are slit and perforated as in Step 4, above.

The seventh step is to relocate the first even numbered strip, as in Step 5, above, to the seaming/splicing table section where the first pair of odd-numbered and even-numbered strips are aligned by a laser-guided robotic positioning system relative to each other in both the horizontal and vertical directions. Vertical alignment is performed to match-up the position of the laser perforations. The horizontal alignment is performed in order to assure that the gap between the pair of film strips is <60 microns. Once the pair of strips has been aligned relative to each other, they are temporarily secured via partial vacuum pressure, as in Step 2, above.

The eighth step comprises joining of the two film strips by chemical welding (or a similar process) a backing strip to the splice area along the length of the splice.

Steps 1 through 8 (above) are repeated, thereby adding strips until the screen has attained the desired horizontal width (e.g., 40 to 80 feet). Note that the final strip (whether odd or even) does not have its right-hand edge laser cut.

For standard size viewing screens, one way to have no seam in the fabricated seams be visible to viewers is to have the fabricated seams can have a less than 70 micron seam gap as, at a viewing distance of 1 to 1.5 times the screen height. The seams can be further camouflaged by optical camouflage techniques such as non reflective backing tape, reflective backing tape with optical properties similar to those of the screen's front surface, printing of camouflage patterns on the screen, or non-linear seam lines.

The precision process of applying the liquid solvent/adhesive solution starts with the strips of film being held in place on a precision vacuum table by vacuum force. It is operationally desirable for the structural integrity and dimensional stability under high static loads to be promoted, and fabric-like qualities in the finished screen to be maintained. To do so, a chemical welding process can be used. The chemical welding process used for the exemplary embodiments bonded 15 mil screen material with strips of 15 mil backing/seaming tape. After the strips are aligned, in the exemplary embodiment at a spacing of about 50 mils to about 70 mils, with a spacing of 60 mils being advantageously operable. After being positioned correctly, the two strips are held in place by the vacuum table, a chemical welding solvent solution (such as Weld-On 16 that can be purchased from Home Depot) can be applied at a width of about ⅛" to about 1", depending on the size of the tape to be applied, on each strip being seamed to each side of the line between two strips. Backing tape is then applied by using tape applicator. The backing tape can be of the same material as the strips themselves, and be of a width of about ¼" to about 2" depending on the size of the screen and the forces to be applied upon deployment. The time gap between solution dispersion and tape application should be less than 5 seconds. Controlled amounts of adhesive are applied to the back side of the film by a dispensing nozzle which controls the amount of adhesive/solvent such that it does not penetrate deeper than level where structural integrity begins to be compromised and distortion of the screen's front surface may occur. This can be done by using a glue/solvent applicator with a flow control nozzle behind the (2 to 20 mil thick) backing tape.

Apply the tape over the solvent centered on the line between the two strips with a pressure roller applying a pressure of about 0.3 psi to about 1.5 psi. The solvent can then be permitted to cure at room temperature. The seaming comprises, exemplarily, 1.5 inch wide strips of the same material used to fabricate the screen (PC or other similar materials). The chemical welding essentially "melts" the seaming tape strips and the screen's substrate together, leaving them as substantially one monolithic piece when the solvent evaporates. Pressure is then applied via cylindrical rollers to complete the precision process of bonding the backing tape to the strips of the screen substrate. This backing and seaming tape has three main functions: A) as seaming material to maintain the proper gap (50 to 70 microns, particularly below 60 microns) and B) as a structural element to promote dimensional stability over the entire screen area and C) as optical camouflage, serving to further "hide" the gap between spliced strips. The automated tape applicator can be used with the appropriate adhesive/solvents for the particular screen/backing strips being utilized. The adhesives or solvents can be delivered by a precision dispensing nozzle which controls the exact amount of solvent and the path of the dispensed stripe of adhesive or solvent with a width equal to that of the seaming tape plus or minus about 10 microns. A precision process of applying the liquid solvent/adhesive solution, along with carefully controlled curing timing can achieve a desired level of solvent of penetration and sufficient for proper bonding without any distortion to the front surface is described below.

Specially designed tapes with fully UV/Heat curable adhesives can be utilized as well.

The framing of the screen can be accomplished by placing a 3 inch border of polymer film, laminated to both sides of the unfinished assembled screen material, around the edges of the seamed screen material sheets (four for a rectangular screen). Grommets can then placed a few inches apart around the periphery of the border to permit the screen to be hung according to industry standard techniques. The framing is not limited to such a disposition if used. "Zip lock" style omega channels can also be used in place of the grommets in the border region of the screen and on the screen's frame to maintain the screen in flat condition for use.

Figures 14A, 14B:
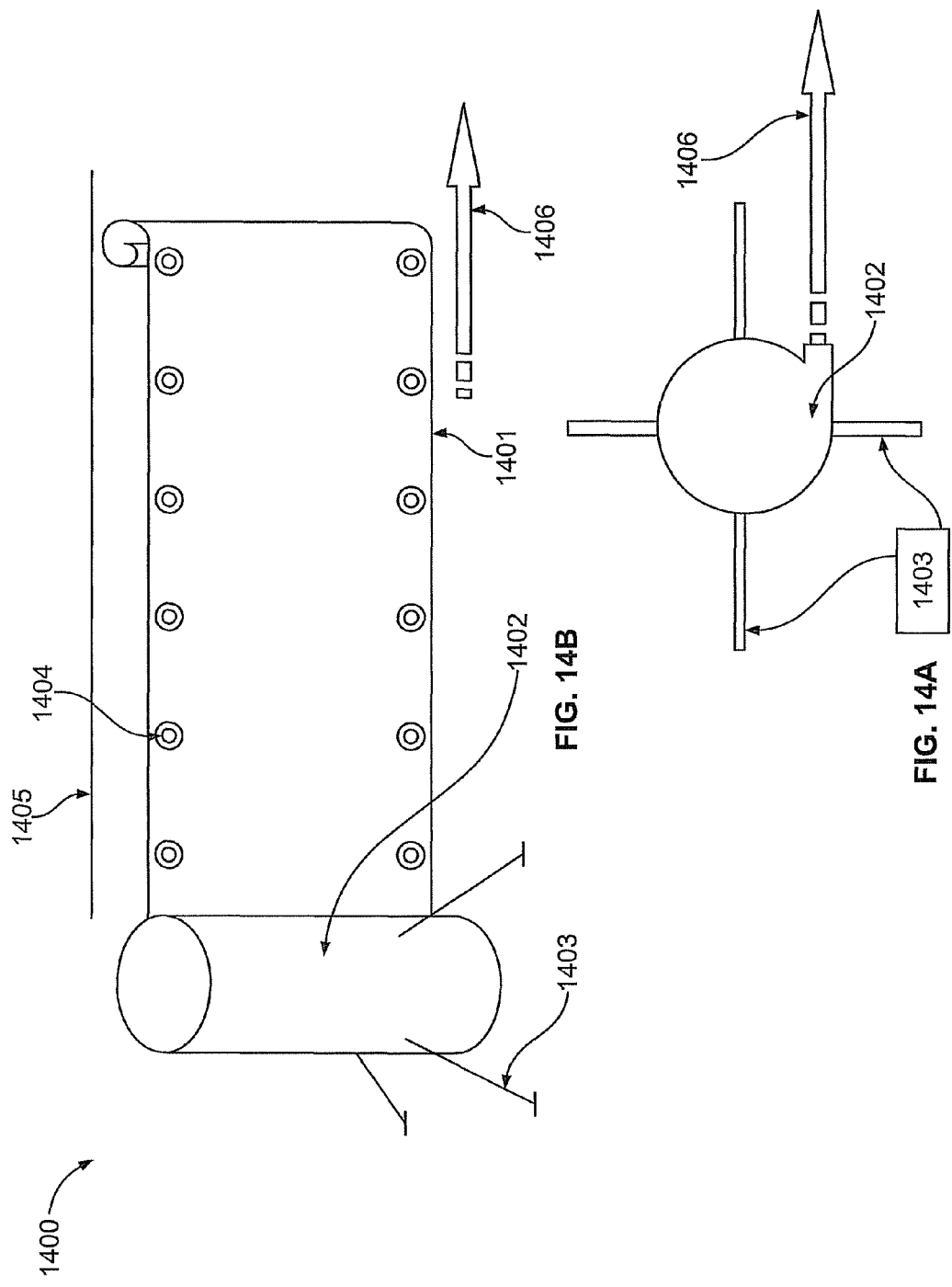
FIGS. 14A and 14B are schematics of the sub-assembly of screen material strips.

Referring to FIG. 14, the sub-assembly of screen material strips 1401 is surrounded by a border of grommets 1404 on its four edges and placed in its specially-designed canister 1402. After being placed on-site (e.g., at a movie theater), the finished screen is deployed 1400 by pulling it from its canister 1403, which is now supported vertically by legs 1403, horizontally 1406 and attaching it dynamically to a tensioned cord 1405 via hooked springs at each grommet 1404. Post-installation, the screen can be tested under actual movie-theater conditions. The results of such a test are shown in Table 1, which show that the present invention, a 2D and 3D (by virtue of its polarization-preserving conformably metallized microstructures) screen capable of outperforming an industry-standard 2D-only screen in terms of reflected light in the viewing field of the theatre. This capability is afforded by the optical microstructures which form a narrow-angle (12 to 17 degrees, +/−1% FWHM) light-shaping diffuser array over the entire surface of the finished screen (without the non-intrusive seams and optional perforations).

Large numbers of movie theaters worldwide are located in buildings with difficult access to the screen area, as they are located on top floors of high-rises, or in old locations such as brick buildings that are difficult or impossible to modify to accommodate the delivery of a large-format, completely-fabricated movie screens, such as the light shaping screen of the present invention.

A reusable large-scale two component shell, formed of a custom canister and a specific radius (24") tube core can form packaging for a finished, delivery-ready screen that avoids the risks that may arise from folding the screen.

Most of the currently fabricated 3-D screens are foldable to a form factor that can be delivered to such theaters in relatively small packages that can easily fit through existing doors and can be carried to the final installation location via elevators or staircases.

The seams and the optical microstructures of the light shaping screens that are the subject of this invention may be damaged if the screens are folded. The risks of folding can be avoided if the product is rolled and placed into large (>24") diameter tubes in order to protect the optical structures on front of the screen. But such precautions may not sufficiently compact the form factor for deployment in many locations, including those with restricted shipping access.

Installation of screens into locations where delivery is difficult can be done through the use of a "zip lock" style screen deployment system. The first step in this on-site screen assembly process is the deployment of an on-site fabrication platform in the deployment location. The second step is to unroll the prefabricated sections (film strips) of the screen (which have been transported to the site in miniature versions of the shipping acoustic described above, on top of the platform facedown and assemble them together to the full screen format using a system of zip locks attached to the back of each section. These zip locks (matching sets of factory-placed, pre-aligned interlocking groove structures) are designed in such a way that when they are pulled together, the constriction of pretension and a set of backing guide plates ensures a precise fit of the odd-numbered and even-numbered film strips under tension to ensure that each splice gap is less than 60 microns wide along its entire run length. Once the full screen is assembled on the temporary assembly scaffold, a liquid adhesive is released from Omega channels running the length of the seam in order to permanently glue the strips together so as to form the completed light shaping screen structure.

The last step in the final assembly process is to zip lock (via pre-placed interlocking groove structures) or shoelace (via pre-placed grommets) the screen to the mounting frame and erect the frame to the required position. During this on-site assembly and deployment process, the front part of the screen is facing down and has been protected by a protective liner film. Once screen is erected and all the other installation steps have been completed, the protective liner film can be removed, making the 2D/3D light shaping cinema screen ready for use.

Figure 15:
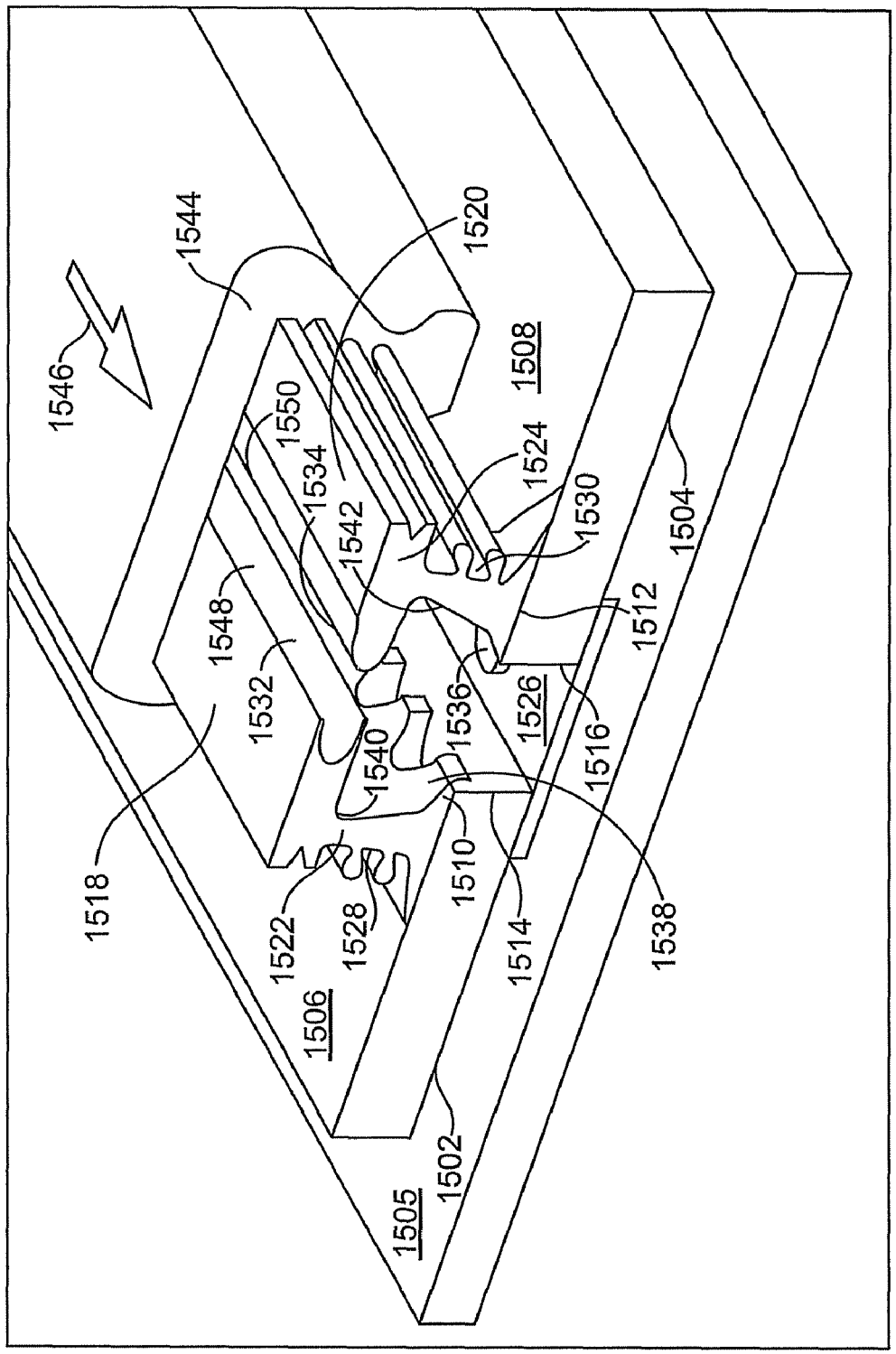
FIG. 15 is a blown up drawing of the seam of the present invention.

There are many theatres that may not have delivery entrances that can readily accept a non-folded movie screen. But the screen of the present disclosure can be delivered in parts and assembled. Screen strips can be seamed, as described above, to form sections comprising one or more strips. Referring to FIG. 15, a first section 1502 is disposed near a second section 1504 spaced from a work surface 1505 by non-stick silicone tape 1503. The first section 1502 has a first beam 1506 disposed on it, while the second section 1504 has a second beam 1508 disposed on it, the beams 1506 and 1508 being disposed along the length of the sections 1502 and 1504 to be joined Each of the first 1506 and second 1508 beams can be made of the same material as the substrate of the strips. Further, each beam can be generally I-shaped, as depicted in FIG. 15, but can have other shapes as long as the beams provide a sealed central cavity when brought together. Each of the first beam 1506 and second beam 1508 has a respective first bottom portion 1510 and second bottom portion 1512 adjacent the respective first substrate 1502 and second substrate 1504 near the respective first long edge 1514 and second long edge 1516 of a sheet. Using the chemical welding process described earlier, and the vacuum table described above, the bottom portions 1506 and 1508 of beams 1504 a& 1506 can be precisely located at the long edges 1514 & 1516 of the sections 1502 & 1504. Beams can be positioned to overhang the respective long edge by 25-35 microns if they are not interlocking, with respective adjustments if the beams are configured to interlock. Two sections that are pre-determined for joining can be provided with complementary first and second beams.

Each also has a respective first top portion 1518 and second top portion 1520 spaced from the respective first substrate 1502 and second substrate 1524 by a respective first center portion 1522 and second center portion 1504 that connect the respective first top portion 1518 to the first bottom portion 1510 and the second top portion 1520 to the second bottom portion 1512. Further, the first beam 1502 and second beam 1504 have a respective first urging face 1522 and a second urging face 1524 that are disposed to be pressed towards the seam gap 1526. The first urging face 1522 and second urging face 1524 can respectively have a first set channels 1528 and second set of channels 1530 formed in them. The first top portion 1518 and the second top portion 1520 each have respective and interlockingly opposing a first top sealing face 1532 and a second top sealing face 1534. Also, the first bottom portion 1510 and the second bottom portion 1512 each have respective and sealingly opposing a first bottom sealing face 1536 and a second bottom sealing face 1538. The first beam 1506 and the second beam 1508 also each define a respective first beam recess 1540 and a second beam recess 1542.

The first beam 1506 and second beam 1508 are configured when brought into intimate contact at the respective pairs of first 1536 and second bottom sealing faces 1538 and first 1532 and second top sealing faces 1534 with each other to form a leak-free channel running the length of the seam. An example of one configuration is provided at the first 1532 and second top sealing faces 1534. First sealing face 1532 has a concave recess 1548 that is complemented by a convex region 1550. An alternative sealing configuration is displayed for the first 1536 and second bottom sealing faces 1538. In that case, the first bottom sealing face may have a first set of teeth. Also, the second bottom sealing face may have a second set of teeth that are complementary to the first set of teeth. Further, an omega channel is configured to engage (by sliding) the first urging face with its first set of urging channels and the second urging face with its respective second set of urging channels, and force the respective sealing faces together as the omega channel simultaneously slides along the lengths of the first beam and the second beam to engage the entirety of them. The direction of intended travel of the omega channel 1544 is indicated by arrow 1546.

Figures 18, 19:
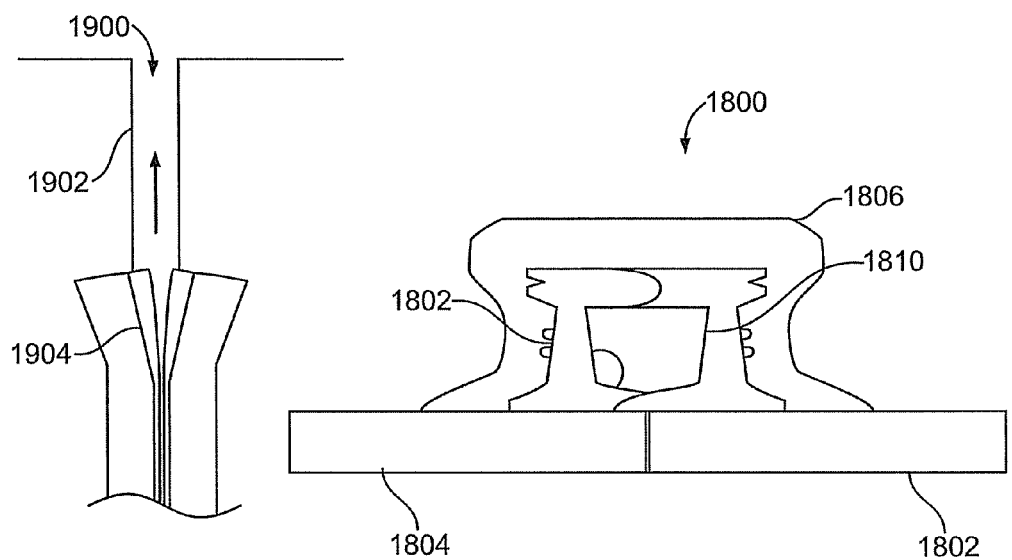
FIG. 18 shows the manner of infusing resin on the screen material sections.
FIG. 19 is a top view of the channel of the subject invention.

FIG. 19, is a top view of the channel 1900. The omega channel 1900 has a straight portion 1902 and a narrowing portion 1904. The narrowing portion 1904 is widest at a leading end 1906 of the omega channel 1908, and gradually narrows to match the straight portion 1902. Thus, the omega channel as it slides along beams (as in FIG. 15), forces the beams together to the pre-determined tolerance.

Continuing with FIG. 15, the first beam 1506 and second beam 1508 are positioned to be placed to bring the first screen 1502 and the second screen 1504 into very close contact with each other. The width of the seam to be formed can be in the range of 50 microns to 70 microns. The first beam 1506 and second beam 1508 can be positioned with sufficient precision to accomplish this with the aid of a laser positioning system. In the illustrated embodiment 1500, the concave recess 1548 and the convex region 1550 as well as the first set of teeth 1552 and the second set of teeth 1554 are configured to have one sixteenth of an inch overlap. The extension of each of the respective first beam 1506 and second beam 1508 onto the second section 1504 and the first section 1502 assists in maintaining precise alignment of the first sheet 1502 and the second sheet 1504 to each other.

Figure 16:
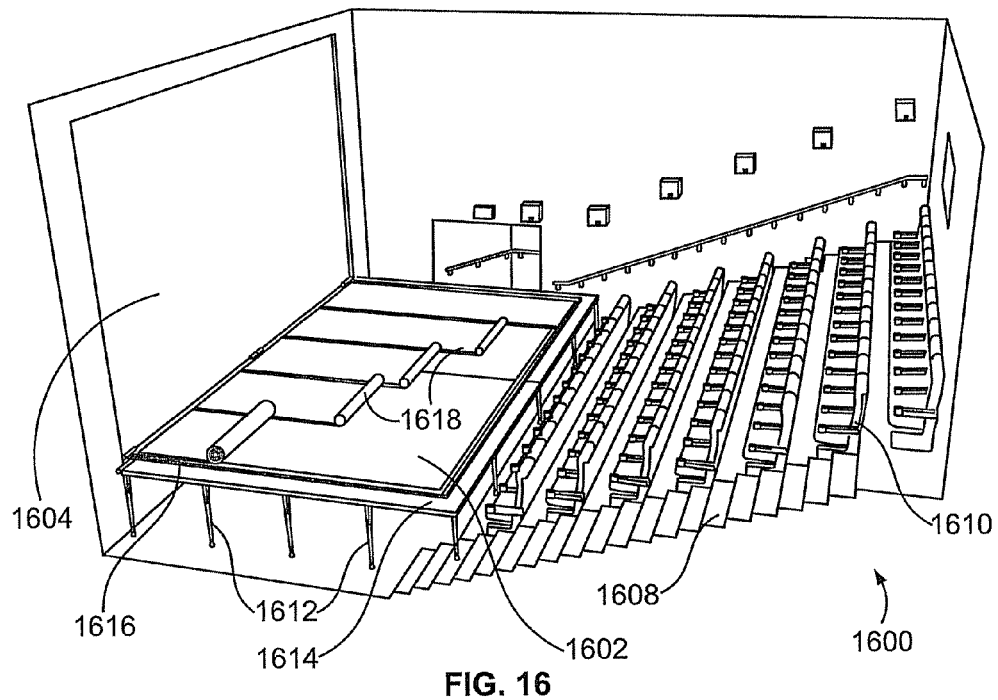
FIG. 16 shows an assembled work surface in a theater.

A work surface 1602 can be assembled in the movie theatre 1600 as shown in FIG. 16. The theatre 1600 often comprises a projection screen area 1604, a foreground 1606 and a tiered section 1608 having a plurality of seats 1610. The work surface 1602 comprises a plurality of adjustable-height legs 1612 and a flat surface 1614 sufficient to support the weight of the screen sections 1616 to be assembled. The work surface 1602 can be any of a large number of mobile stages such as the SICO Folding leg stage and riser system available from SICO America, Inc. of 7525 Cahill Road, Minneapolis, Minn. in the United States, and other international branches that can be found with the assistance of that branch. Framing 1616 can be prepositioned so that when the plurality of sections 1618 are deployed onto the work surface 1602 after the sections 1618 are joined they can be framed and lifted into the projection screen area 1604.

Optionally, prior to being shipped to the work site, or at any other desirable point, screen sections or strips can have a protective peel-off coating applied to them for shipment and installation protection.

Figure 17:
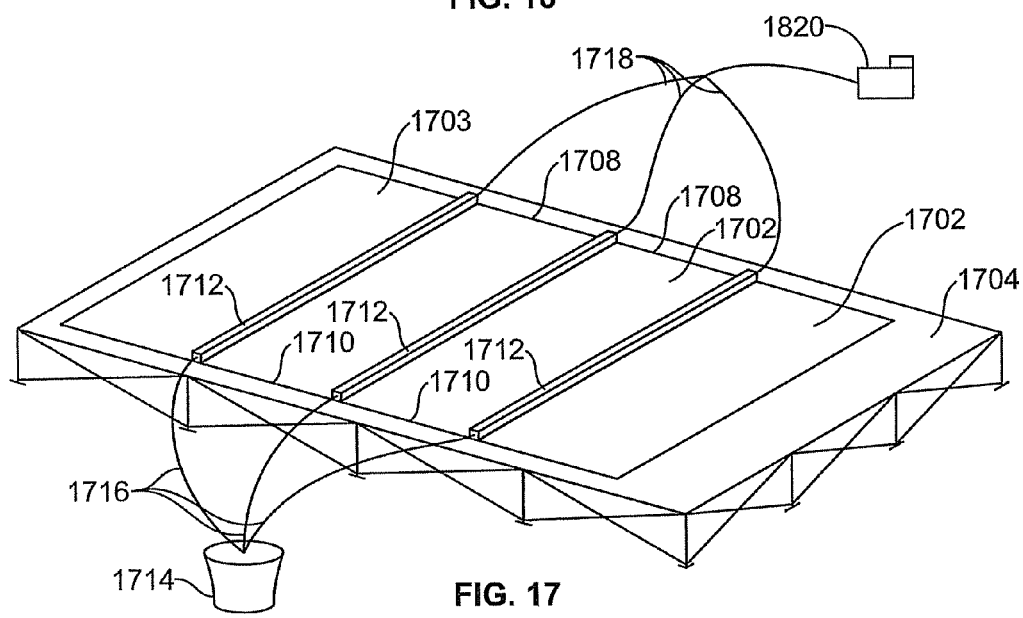
FIG. 17 is a cross-section of the omega channel of the present invention.

Referring to FIG. 17, a plurality of sections 1702 are placed on the work surface 1704. The omega channels are pulled from one of the top end 1708 and bottom end 1710 of the sections 1702 to the other of the top end 1708 and bottom end 1710 to form a connector 1712. The result is that the connectors 1712 extend the entire length from the top end 1708 to the bottom end 1710 where sections 1702 meet each other. A resin container 1714, operably about 10 gallons in size, is connected to a plurality of half-inch fluoropolymer (e.g. TEFLON) resin tubes 1716 to each of the connectors 1712. The connectors 1712 are attached to the resin tubes 1716 in a fashion that is leak-free to air. At the other of the top end 1708 or the bottom end 1710 of the sections 1702, pump tubes 1718 lead from each of the connectors 1712 to a vacuum pump 1720. The connections for the pump tubes 1718 will be leak-free to air. The resin container 1714 can filled with resin, and the resin tubes immersed in resin. The resin can be an air-cured resin or a heat-cured resin, but it can be advantageous to select the materials so that a UV-curable resin can be used and cured. The vacuum pump 1720 can then be activated, reducing the pressure in the resin tubes 1716, the pump tubes 1718, and the connectors 1712. When the pressure has been sufficiently reduced (depending upon the height difference between the resin and the connectors) resin will flow from the resin container 1714 toward the vacuum pump 1720 through, successively, the resin tubes 1716, the connectors 1712 and then the pump tubes 1718. When the resin has filled the connectors 1712, the vacuum pump can be stopped. Optionally, the resin can contain fill or reinforcing material to further strengthen the finished connectors. After the resin is cured, the resin tubes 1716 and pump tubes 1718 cam be removed, and the screen prepared for hanging as disclosed earlier.

FIG. 18 illustrates a cross-section of a finished connector 1800. A first section 1802 and a second section 1804 are spaced by a seam gap 1806 averaging from about 50 microns to about 70 microns between the sections. An omega channel 1806 surrounds a 1808 first beam and a second beam 1810. The sealed first beam 1808 and second beam 1810 adhesively engage the cured resin 1812. The cured resin 1812 (optionally fiber filled or reinforced) holds the beams 1808 and 1810 in place such that the omega channel 1806, the first beam 1808, the second beam 1810, and the cured resin 1812 form a solid, supporting maintaining the positions of the first section 1802 and the second section 1804 relative to each other. Also, as illustrated in FIG. 18, the beams can form their cavity such that the angle a1 can be about 70 degrees, and that angle $\alpha 2$ can be about 88 degrees.

Although the above textual and graphical description of the present invention and its method of use may allow one skilled in the art to make and use what is currently believed to be substantially the best mode of the present invention, those skilled in the art will also understand that there will exist variations to and combinations of the elements contained in the specific methods, embodiments and/or examples described herein. Therefore, the present invention, herein disclosed, shall not be limited by the specific embodiments, examples or methods described in the text or figures above and that all such variations and combinations are intended by the inventor(s) to be within the scope and spirit of the present invention.

We claim:

1. A reflective screen comprising:
    a plurality of strips having a first face and a second face, and first and second long edges, and first and second end edges, the strips being positioned so that the second long edge of a strip is placed adjacent the first long edge of an adjacent strip, the plurality of strips being arranged with the first and last strips each having one long edge adjacent another strip, and any additional strips having both long edges adjacent another strip;
    a first means for controlling the viewing angle, said first means comprising a continuous contour of smoothly varying, irregularly placed and irregularly sized laser-speckle generated microstructures on the first face of each of the plurality of strips, the microstructures having a mean feature size that both refracts and diffracts visible light;
    a reflective coating formed to follow the contours of the microstructures, the reflective coating of each respective strip being spaced from the second face by the microstructures;
    a second means for controlling the viewing angle; said second means comprising a hard coating following the contours of the microstructures, the hard coating of each respective strip being spaced from the microstructures by the reflective coating;

a second plurality of seams joining the second long edge of one of the plurality of strips with the first long edge of an adjacent strip of the plurality of strips to form a screen having as opposing first and second screen edges the long edges of the first and last strips that are not seamed to another strip, and the two sets of end edges comprising opposing third and fourth screen edges that are transverse to the first and second screen edges, the distance between either the first and second screen edges or the third and fourth screen edges being the height of the screen; and wherein the strips have a thickness that maintains the dimensional stability of the assembled screen when the screen is hung vertically from one of the screen edges, the combination of the reflectively coated and hard coated microstructures being configured to provide a viewing angle of light projected onto the screen 80° to 130°, whereby the hard coating preserves the reflective properties of the reflective coating, and the seams are configured to be not noticeable by a viewer of a projected image at a distance equal to the height of the screen.

2. A reflective screen comprising:

a plurality of strips having a first face and a second face, and first and second long edges, and first and second end edges, the strips being positioned so that the second long edge of a strip is placed adjacent the first long edge of an adjacent strip, the plurality of strips being arranged with the first and last strips each having one long edge adjacent another strip, and any additional strips having both long edges adjacent another strip;

a continuous contour of smoothly varying, irregularly placed and irregularly sized microstructures on the first face of each of the plurality of strips the microstructures have a feature size of 2 to about 30 micrometers, and a modulation of less than about 5 micrometers normal to the screen;

a reflective coating formed to follow the contours of the microstructures, the reflective coating of each respective strip being spaced from the second face by the microstructures; and a second plurality of seams joining the second long edge of one of the plurality of strips with the first long edge of an adjacent strip of the plurality of strips, such that the plurality of strips are from one substantially planar object.

3. The reflective screen of claim 2 where the strips are about 10 mils to about 20 mils thick.

4. The reflective screen of claim 2 where the strips are about 15 mils thick.

5. The reflective screen of claim 2, where the strips are made of one or more of polycarbonate, polyethylene terephthalate, PETG, polyvinyl chloride, polyvinylidene fluoride, and polyimide.

6. The reflective screen of claim 2, where the microstructure has solid angle full width at half-maximum distribution of 8 to 22 FWHM degrees for light traveling from the viewing side to the back side.

7. The reflective screen of claim 2, wherein the strips are polymeric with long edges are cut straight to within a tolerance of plus or minus 10 microns.

8. The reflective screen of claim 2, wherein the strips are polymeric and have long edges cut straight to within a tolerance of plus or minus 5 microns.

9. The reflective screen of claim 2, wherein the seams are no more than 5 microns thicker than the unseamed sections of the sheets.

10. The reflective screen of claim 2 further including laser cut perforations in the reflective screen to allow sound to pass through the reflective screen.

11. A reflective screen comprising:

a first plurality of strips of polycarbonate film, about 15 mils thick having a first face and a second face, and first and second long edges, and first and second end edges, the strips being positioned relative to each other such that the second long edge of a strip is placed adjacent the first long edge of an adjacent strip, the first plurality of strips being arranged with the first and last strips each having one long edge adjacent another strip, and any additional strips having both long edges adjacent another strip, each of the long edges that are adjacent to another strip being trimmed to within a tolerance of plus or minus 5 microns ;

a cured epoxy layer in intimate contact with the polycarbonate film, having a surface not in contact with the polycarbonate that has a continuous contour of smoothly varying, irregularly placed and irregularly sized microstructures, the microstructures being formed to diffuse light transmitted perpendicularly through the cured epoxy layer and the polycarbonate layer at a solid angle of from about 14- to about 15 degrees full-width of half-maximum;

a reflective aluminum coating, having a substantially uniform thickness of between 700 and 1200 angstroms, in intimate contact with the cured epoxy layer, having a surface not in contact with the aluminum coating that follows the shape of the microstructures;

a silicon dioxide coat 25 angstroms to 250 angstroms thick, formed on the reflective aluminum coating to follow the contours of the microstructures; and a second plurality of seams, the seams having a seam gap of about 50 microns to about 70 microns, joining the second long edge of one of the plurality of strips with the first long edge of an adjacent strip of the plurality of strips.

12. The reflective screen of claim 11 further including laser cut perforations in the reflective screen to allow sound to pass through the reflective screen.

13. A method of assembling two sections of a cinema screen comprising:

providing at least a first section and a second section of cinema screen, each cinema screen having a substrate portion, a long edge, and a projection surface;

providing at least two complementary beams, a first beam and a second beam, each beam having a bottom portion, a center portion, and a top portion spaced from the bottom portion by the center portion, the two complementary beams being configured to seal against each other to form a sealed cavity, each beam having an urging wall portion, the two urging wall portions being spaced from each other by substantially all of the two beams from each other such that when force is applied to the urging walls, the complementary beams would be brought together in a complementary fashion;

affixing the first and second beams to the first and second sections at the long edges of the first and second sections, positioned so that when the first and second beams are brought into complementary engagement, the first section and the second section will form a seam gap between them of about 50 microns to about 70 microns;

providing an omega channel, the omega channel having a straight wall portion followed by a narrow wall portion and for engaging the urging walls portions to bring the first beam and second beam into complementary contact when the omega channel is positioned around the first and second beams;

positioning the omega channel around the first and second beams and bringing the first and second beams into complementary contact to form a sealed channel;

introducing resin into the sealed channel; and curing the resin.

14. A seam for a reflective screen comprising:

at least a first section and a second section of cinema screen, the first section and the second section forming a seam gap;

a first beam and a second beam, each beam having a bottom portion, a center portion, and a top portion spaced from the bottom portion by the center portion, the two complementary beams being sealed against each other to form a sealed cavity, and the remainder of the surface of the first beam and the second beam being beam exterior surface, each of the first and second beams being respectively sealed to the first section and the second section;

an omega channel, the omega channel engaging the free surface of the first beam and the second beam and comprising a straight portion followed by a narrow portion; and a body of cured resin occupying the sealed cavity, thereby forming a camoflaged seam.

15. A reflective screen comprising:

a plurality of strips having a first face and a second face, and first and second long edges, and first and second end edges, the strips being positioned so that the second long edge of a strip is placed adjacent the first long edge of an adjacent strip, the plurality of strips being arranged with the first and last strips each having one long edge adjacent another strip, and any additional strips having both long edges adjacent another strip;

a continuous contour of smoothly varying, irregularly placed and irregularly sized microstructures on the first face of each of the plurality of strips;

a reflective coating formed to follow the contours of the microstructures, the reflective coating of each respective strip being spaced from the second face by the microstructures;

a hard coating of a thickness dependent on the desired viewing angle; and a second plurality of seams joining the second long edge of one of the plurality of strips with the first long edge of an adjacent strip of the plurality of strips, such that the plurality of strips are from one substantially planar object.

16. The reflective screen of claim 15, wherein the thickness of the hard coating is varied from 25 to 250 angstroms to thereby vary the viewing angle.

17. The reflective screen of claim 15, wherein the hardcoating is selected from the group consisting of —$SiO_2$, $SiO_x$, $TiO_2$ or TiN.

* * * * *